April 14, 1931.  R. P. HANSON  1,801,237
GATE VALVE
Filed Jan. 26, 1927
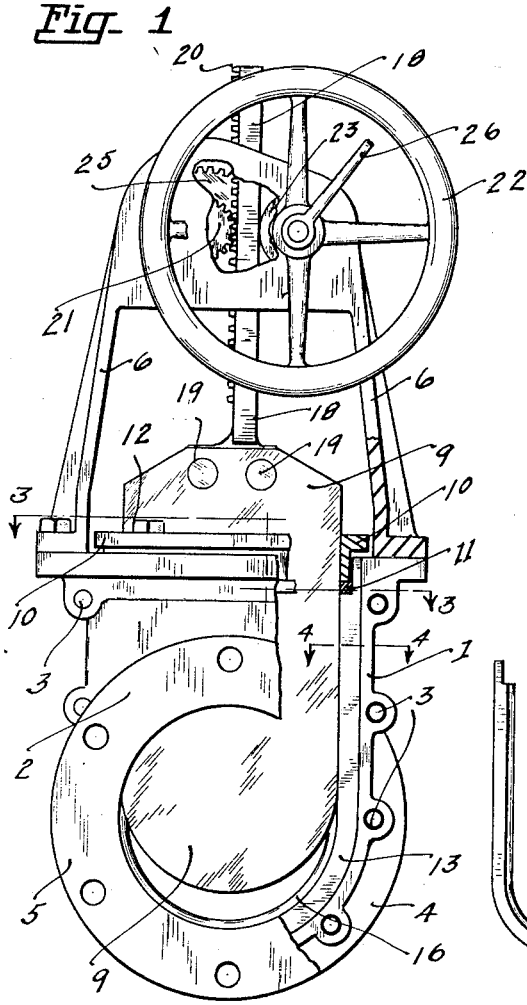
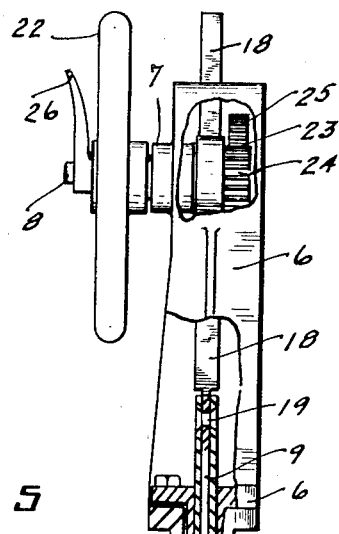
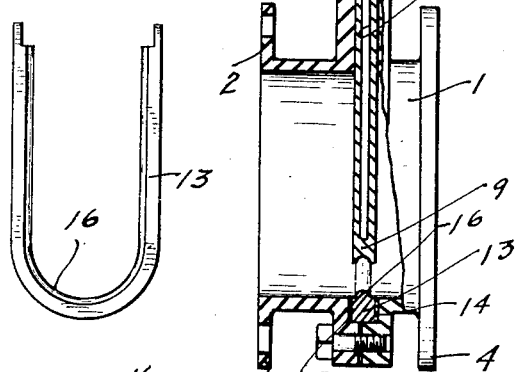
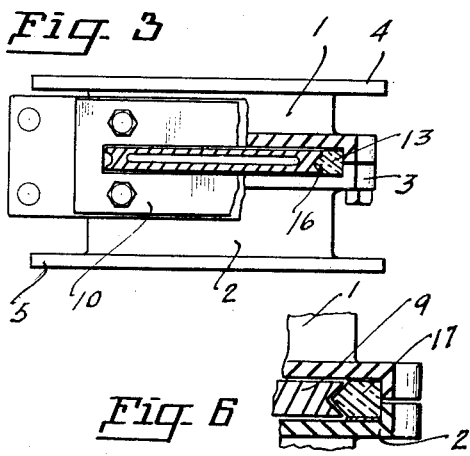
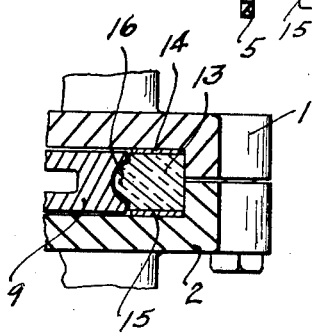
Inventor
Robert P. Hanson
By Thomas Bilyeu
Attorney Patented Apr. 14, 1931

1,801,237

UNITED STATES PATENT OFFICE

ROBERT P. HANSON, OF PORTLAND, OREGON, ASSIGNOR TO WESTERN FOUNDRY COMPANY, OF PORTLAND, OREGON

GATE VALVE

Application filed January 26, 1927. Serial No. 163,712.

My invention relates to gate valves and more particularly adapted for use wherein materials are being handled having a large percentage of materials in suspension within a carrying liquid, such as skumes, pulp and paper materials in process of manufacture, ground wood and any and all materials wherein a fairly large percentage of solids are carried in suspension in the carrying liquid.

My invention consisting primarily in a valve of two body section members having disposed therebetween the engaging element with which the gate valve diaphragm is made to contact, the contour of the contacting surfaces being such that the passing of the liquids or materials therethrough have the tendency to clear the engaging surfaces and to prevent the deposit of the materials upon the engaging surfaces. New and novel improvements being provided also for the raising and lowering of the valve diaphragm.

A further object of my new and improved device, consists in having a valve structure that is easy assembled and disassembled and one wherein the parts of the same may be easily machined and processed for assembling.

A still further object of my device consists in providing in the valve structure of a renewable engaging element to which the valve diaphragm is made to engage.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front elevation, partially in section, of my assembled device.

Fig. 2 is a side elevation, partially in section, of the mechanism illustrated in Fig. 1.

Fig. 3 is a sectional top plan view, taken on line 3—3 of Fig. 1, looking in the direction indicated.

Fig. 4 is a cross section view, taken on line 4—4 of Fig. 1, looking in the direction indicated.

Fig. 5 is a detached, side view, of the renewable engaging element placed within the valve and against which the diaphragm of the valve is made to engage with.

Fig. 6 is a fragmentary cross section view, of another form of engaging element for the diaphragm of the valve to engage.

Like reference characters refer to like parts throughout the several views.

I preferably form my valve body of two corresponding sections 1 and 2, secured together by suitable fastening means, as by bolts passing through the openings 3, to secure the side members 1 and 2 together. Flanges 4 and 5 being formed to permit of the same being fastened to the conduits related thereto. A frame 6 is associated with the body member 1 which has a suitable bearing hub 7 secured associated therewith, to permit of the shaft 8 being journaled therein. A diaphragm 9 is adapted to engagement within the body members and the packing gland 10 is placed thereabout for making a tight connection to prevent the escapement of liquid therearound. Packing material 11 is compressed by the packing gland 10; suitable fastening elements 12 maintain the packing gland under compression in relation with the packing material. An engaging member 13 is placed between the two body members 1 and 2 and is positioned thereby; packing material 14 and 15 being associated with either side thereof to prevent leakage and when the body members 1 and 2 are properly adjusted in place, the packing material prevents leakage of the material being passed. Under certain conditions and when certain materials are being passed through the conduits and through the valve, it may be found desirable to make the element 13 of compressible material, as rubber or fiber.

The engaging member 13 may be removed from the valve casing without disconnecting the members 1 and 2. The members 13 are retained within a recess formed between the two members 1 and 2, and may be removed through the opening in the upper part of the casing through which the diaphragm or blade 9 operates. This is accomplished by first removing the blade 9, the frame 6, and the packing gland 10. The member 13, or a new member substituted therefor, may be placed in the casing by merely reversing the operation.

I have found satisfactory results obtain when a rib 16 is disposed on the inner surface of the member 13, to cause an overflow and a ripple of the material passing, thus preventing a clogging of the material, and a compressing of the material especially when the same is being used for ground wood pulp and like products. The contour of the meeting edges of the diaphragm 9 is made to fit that of the element 13, to form a tight connection therebetween when in engagement.

Another preferable embodiment of my construction is illustrated in Fig. 6, wherein the meeting edges of the element 17, and the diaphragm 9 are arranged as illustrated in Fig. 6, although this does not give the uniform satisfactory results as that obtained, as the construction illustrated in Fig. 4 and Fig. 5. A rack 18 is associated with the outer upper end of the diaphragm 9 and is secured to the diaphragm 9 by any suitable fastening means, as by countersunk rivets 19. The rack 18 has teeth 20 disposed upon one side thereof and is adapted to engagement with the raising and lowering gear 21. The hand wheel 22 is secured to the shaft 8. Also mounted upon the shaft 8, is a roller 23, which is adapted to engagement with the back of the rack 18 to position and maintain the same in place. Also mounted upon the shaft 8, is a gear 24, which is in meshed relationship with the gear 25; the gear 25 is mounted upon a stub-shaft, to which the gear 21 is also secured and therefore the rotation of the hand wheel 22 rotates the gear 24 and, therefore, the gear 25 which is meshed in relationship therewith, this in turn drives the shaft to which gear 21 is attached and therefore raises and lowers the rack 18 and the diaphragm secured thereto. A locking lever 26 is in threaded relationship with the outer end of the shaft 8, which permits of the removal of the hand wheel from the shaft 8 by the removing of the locking lever 26.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

The combination of two corresponding valve casings, each having a central bore identical to the other, said casings being connected together end to end and including means for so connecting them together, each of said casings at their joining ends, having corresponding angularly defined recesses opening into the aforesaid bores, which together constitute a pronounced recess having spaced parallel side walls disposed at a right angle to the axis of the aforesaid bores and a bottom wall parallel thereto, a removable gasket occupying said last recess, said gasket having a portion projecting from the confines of the aforesaid recess, said projecting portion being semicircular in cross section, and a valve gate slidable between said casings having a groove to receive the projecting portion of said gasket substantially as and for the purposes specified.

ROBERT P. HANSON.